US011909146B2

(12) United States Patent
Schneider

(10) Patent No.: US 11,909,146 B2
(45) Date of Patent: Feb. 20, 2024

(54) SINGLE PAIR ETHERNET CONNECTOR

(71) Applicant: TURCK Holding GmbH, Halver (DE)

(72) Inventor: Michael Schneider, Hagen (DE)

(73) Assignee: TURCK HOLDING GMBH, Halver (DE)

( * ) Notice: Subject to any disclaimer, the term of this patent is extended or adjusted under 35 U.S.C. 154(b) by 55 days.

(21) Appl. No.: 17/724,524

(22) Filed: Apr. 20, 2022

(65) Prior Publication Data

US 2022/0344879 A1 Oct. 27, 2022

(30) Foreign Application Priority Data

Apr. 22, 2021 (DE) ..................... 10 2021 110 192.1

(51) Int. Cl.
*H01R 13/71* (2006.01)
*H01R 13/717* (2006.01)

(52) U.S. Cl.
CPC ..... *H01R 13/7175* (2013.01); *H01R 13/7172* (2013.01)

(58) Field of Classification Search
CPC . H01R 13/7175; H01R 13/7172; H01R 13/66
See application file for complete search history.

(56) References Cited

U.S. PATENT DOCUMENTS 5,244,409 A 9/1993 Guss, III et al.
5,409,398 A 4/1995 Chadbourne et al.
5,554,049 A 9/1996 Reynolds
6,257,906 B1 * 7/2001 Price ...................... H01R 13/60 439/910
9,413,122 B2 * 8/2016 Wu .................... H01R 13/6587
9,531,137 B2 * 12/2016 Zhou .................. H01R 13/7172
9,711,914 B2 7/2017 Xing et al.
10,347,092 B2 7/2019 Dolezalek
2003/0211782 A1 * 11/2003 Esparaz ............ H01R 13/6658 439/620.11
2006/0286854 A1 12/2006 Kuo
2008/0090451 A1 * 4/2008 Feldman .............. H01R 12/716 439/490
2009/0269972 A1 10/2009 Zhou et al.
2013/0308304 A1 * 11/2013 Tuchrelo ............ H01R 13/7175 362/257
2014/0213100 A1 * 7/2014 Xuan ................. H01R 13/7175 439/490
2021/0006002 A1 1/2021 Sargis et al.

FOREIGN PATENT DOCUMENTS

DE 102015119557 A1 5/2017

* cited by examiner

*Primary Examiner* — Truc T Nguyen
(74) *Attorney, Agent, or Firm* — LEYDIG, VOIT & MAYER, LTD.

(57) ABSTRACT

A connector device produces a connection by means of Single Pair Ethernet (SPE). The connector device includes at least one connection element for an SPE connection, a light source for generating a light emission, and a light-guide element. The light source is set up to couple the generated light emission into the light-guide element, and the light-guide element is set up to couple an output-light distribution out in a coupling-out area.

18 Claims, 3 Drawing Sheets

SINGLE PAIR ETHERNET CONNECTOR

CROSS REFERENCE TO RELATED APPLICATIONS

This application claims benefit to German Patent Application No. DE 10 2021 110 192.1, filed on Apr. 22, 2021, which is hereby incorporated by reference herein.

FIELD

The present invention relates to a connector device for producing a connection by means of Single Pair Ethernet (SPE). In particular, the invention relates to a connector device for producing a connection by means of SPE with an optical signalling device.

BACKGROUND

In modern systems, for instance for the automation of manufacturing processes or in other contexts, a simple, rapid and flexible networking of sensors, actuators and further devices is desired. One of the possibilities for connecting components is an SPE plug-in connection.

In many cases, sensors, actuators or devices formed as rod-shaped are used, for instance with an elongate or rod-shaped housing, wherein industrial 4-pin connectors are often used for data connections and for power supply.

It is furthermore desired that a user receives a signal feedback which provides, for instance, information about the functionality, an operating state and the integrity of a connector or a plug-in connection. Such a feedback can be effected directly at a port that is accessible and visually recognizable from the outside.

Until now, no SPE connectors which meet these requirements have been available.

SUMMARY

In an embodiment, the present disclosure provides a connector device for producing a connection by means of Single Pair Ethernet (SPE). The connector device includes at least one connection element for an SPE connection, a light source for generating a light emission, and a light-guide element. The light source is set up to couple the generated light emission into the light-guide element, and the light-guide element is set up to couple an output-light distribution out in a coupling-out area.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
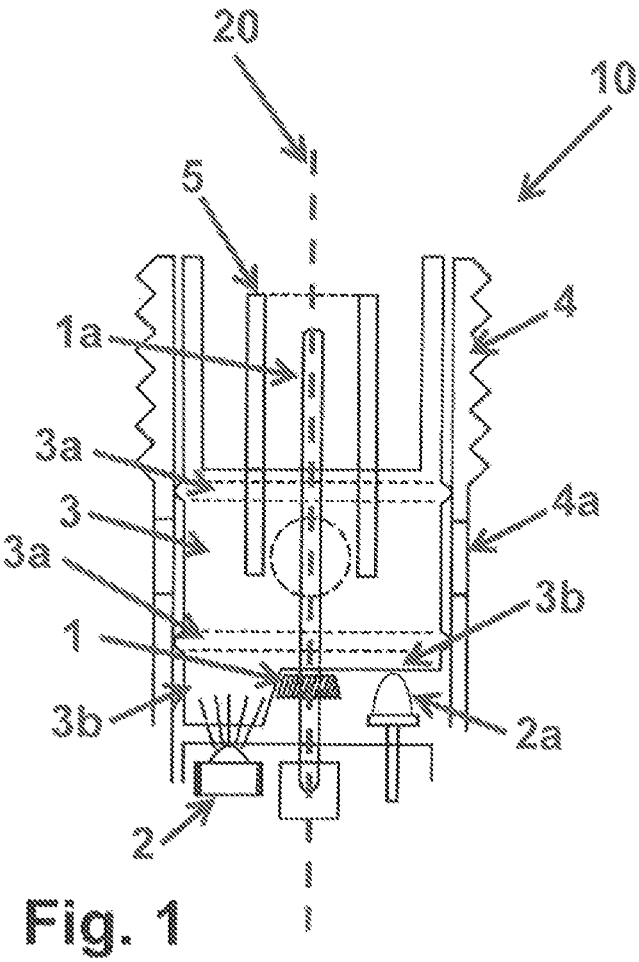
FIG. 1 is a cross-sectional representation of an embodiment example of a connector device.

Embodiments of the present invention provide a connector device which overcomes the named shortcomings of the known devices.

Advantages of the present invention can be accordingly achieved by a connector device for producing a connection by means of Single Pair Ethernet (SPE), comprising at least one connection element for an SPE connection, a light source for generating a light emission and a light-guide element. The light source is set up to couple the generated light emission into the light-guide element. Furthermore, the light-guide element is set up to couple an output-light distribution out in a coupling-out area.

In particular, the light source and the light-guide element can be combined into an optical signalling device. The light emission coupled into the light-guide element is guided or distributed such that the output-light distribution is generated.

Embodiments of the present invention may relate, in particular, to a connector device for a sensor, an actuator or a further device which is connected to further equipment by means of Single Pair Ethernet (SPE). A data connection can be produced via such an SPE connection and/or a power supply can be effected via the SPE connection.

A connector device for SPE connections is provided, such as cannot be achieved in the case of previously usual connectors according to a standard such as IEC 63171-x, in particular when rod-shaped devices or sensors are used.

In the case of a connector device for SPE connections, a very limited installation space is typically available. The connector device according to embodiments of the present invention makes optimum use of this installation space and therefore allows a construction that is integrated to a particularly high degree. The connection element is formed for example in a manner known per se and comprises pins or complementary receivers for pins, in order to be able to produce an electrical connection.

In one design of the connector device, the light source comprises at least one light-emitting diode (LED). In particular, the light source can comprise precisely two light-emitting diodes, which can be arranged opposite each other for example on two sides of a longitudinal axis of the connector device.

In a further design, the light source is set up to generate the generated light emission with a predefined light parameter, for instance with a colour or an intensity. It can be provided that the light parameter can be determined in particular by a control unit.

Such a control unit can be set up in particular to actuate the light source or several light sources, with the result that the light emission can be generated depending on a control signal of the control unit.

The light parameter can comprise, for example, a colour or an intensity. In the case of a more complex structure of the light source and/or of the light-guide element, for instance with a segmented display, the output can have further light parameters or display parameters.

The light parameter can be fixedly predefined, for instance by a circuit for determining a voltage, a current, or a power for the operation of the light source. The light parameter can furthermore be settable or configurable, for instance by means of a user input or by means of a received control signal.

The control unit can furthermore fixedly predefine the light parameter or determine it with reference to a measured value, for instance with reference to an operating parameter of the connector device.

In a development of the connector device, the light source can be set up to generate the generated light emission with a dynamic change of the light parameter. For example, a periodically variable light parameter can be provided, for instance a flashing. The flashing can have, for instance, a periodic brightness change, a switching on/off and/or a periodic alternation of the colour of the light emission. A light parameter for defining such a dynamic light emission can be, for instance, an amplitude, frequency and/or duration of the light emission. For example, a period can furthermore be predefined for a so-called Time-Out, wherein the dynamic light emission ends at the end of this period or a light emission formed in another way is generated.

For example, a static and/or dynamic light parameter can be formed depending on whether there is a data connection and/or a connection for the transmission of power via the connector device. The light parameter can furthermore be formed depending on a quantity of data transmitted by means of the connector device. The light parameter can furthermore be formed depending on a functioning of the connector device, for instance in order to generate a light emission in the case of a detected malfunction that is different from that in the case of a function without detected faults.

In a further design, the light-guide element has a coupling-in surface where the generated light emission can be coupled in.

The coupling-in surface can optionally extend substantially perpendicular to a longitudinal axis of the connector device.

For example, the light source is arranged such that it emits its light emission substantially along the longitudinal axis.

This advantageously makes a particularly compact construction possible, since the light emission can be generated and coupled in in an area which is arranged along the longitudinal axis behind further elements of the connector device, instead of having to arrange a light source and further elements, for instance for connecting a complementary connector, in the same area.

In a further design, the light-guide element has a coupling-out surface in the coupling-out area.

The coupling-out surface can optionally extend substantially parallel to a longitudinal axis of the connector device or along a cylindrical surface around the longitudinal axis. For example, the coupling-out surface is arranged on a housing.

In one embodiment, the coupling-in surface extends perpendicular to the longitudinal axis and the coupling-out surface extends parallel to the longitudinal axis. In particular, light emitted along the longitudinal direction is coupled in and guided or distributed by the light-guide element such that the output-light distribution is coupled out in a direction perpendicular thereto.

The light-guide element can be formed in different ways. In particular, different geometries and/or materials can be provided. For example, the light-guide element can be formed such that light is coupled in by striking the coupling-in surface, in particular at an angle of incidence which runs substantially perpendicular to the coupling-in surface. The coupled-in light can be guided and/or distributed within the volume of the light-guide element by total internal reflection and/or by scattering and/or reflection. Furthermore, other optical mechanisms can be provided, for example a fluorescent material of the light-guide element can be excited by the coupled-in light emission to give light, and this can result in a guiding of the light or of the radiation energy of the light emission from the coupling-in surface to the coupling-out surface.

In an embodiment example, the light-guide element comprises a reflective element for deflecting the coupled-in light emission in the direction of the coupling-out area. The reflective element can comprise for instance a mirrored surface.

In a further embodiment example, the light-guide element is formed solidly of a transparent or partially transparent material, in which the light is guided.

In a further design, the connector device furthermore comprises a housing, wherein the coupling-out area comprises a recess in the housing. The housing can for example be formed opaque. The coupling-out of the output-light distribution reaches from inside to outside through an opening in the housing.

In a further design, the connector device comprises a plurality of coupling-out areas. The coupling-out areas can optionally be arranged distributed evenly around a longitudinal axis of the connector device. It is thereby achieved that the output-light distribution can be perceived from different positions or by looking at the connector device from different perspectives.

In particular, the coupling-out areas are distributed around the longitudinal axis such that the output-light distribution is perceptible from all sides without all of the coupling-out areas being concealed by the connector device or a housing at the same time.

In a further embodiment, the connector device can be formed to receive a request signal or an input and subsequently to output a visually perceptible signal. In particular, this can be a “wink” function, which is to make it easier to identify or locate the connector device. The request signal can for instance be received via a wired data connection or via a wireless data connection. The receipt and processing of the request signal as well as the corresponding actuation of the light source to output the visually perceptible signal can be effected with the aid of a control unit, in particular a control unit comprised by the connector device.

Embodiments of the present invention may furthermore relate to a sensor device with a connector device according to the present description. In particular, such a sensor device comprises a sensor element and the connector device as well as optionally a common housing. In particular, the sensor device can therefore be formed as a one-piece device.

The sensor device can provide the same advantages as the connector device which is comprised by it. Furthermore, a particularly simple structure is advantageously achieved and the stability can be improved.

Analogously thereto, embodiments of the present invention may relate to an actuator device or another device, for instance a control device, which are formed with the connector device in an integrated unit.

Figure 2:
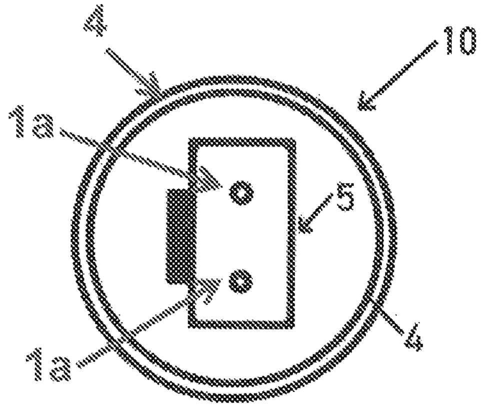
FIG. 2 is a top view of an open end, facing a connector opening, of the embodiment example of the connector device.

A first embodiment example of the connector device is explained with reference to FIGS. 1 to 3.

The connector device 10 has a longitudinal axis 20. This runs such that, when a plug-in connection is produced, a complementary connector device is pushed together with the connector device 10 along this longitudinal axis 20.

The connector device 10 is arranged in a housing 4.

The housing 4 here is manufactured from a non-transparent material.

In this embodiment example, the housing 4 furthermore has an external thread which serves to secure a complementary connector device in the connected state.

In the embodiment example, this is the housing 4 of a sensor, wherein the housing 4 additionally comprises a sensor element. In further embodiment examples, it is possible for only the connector device 10, which is connected to the sensor element and/or another element by a cable, in particular by means of a fixed cable connection, to be arranged in the housing 4.

At the connector-side end of the connector device 10 two pins 1*a* protrude into a volume laterally surrounded by the housing 4 and additionally by a plug-in frame 5. The pins 1*a* with the plug-in frame 5 can in particular be formed according to an industry standard, for instance according to IEC 63171-6.

The pins 1*a* are secured to a pin carrier plate 1 and electrically contacted there such that they are conductively connected to further elements. The contacting and further wires are formed in a manner known per se.

On the side opposite the open end of the connector device, a translucent insert 3 is provided, which takes on the role of a light-guide element 3.

The translucent insert 3 has two sealing lips 3*a*, which run around the circumference of the insert 3 and ensure a sealing of the connector-side end against the further elements behind the insert 3.

The translucent insert 3 has two coupling-in areas 3*b*, which demonstrate different possibilities for coupling light into the material of the translucent insert 3.

In further embodiment examples, an individual coupling-in area 3*b* of the translucent insert 3 can be provided or several coupling-in areas 3*b* with identical geometry can be provided.

A light source 2, 2*a* is provided in the area of each of the two coupling-in areas 3*b*.

In the embodiment example, the light sources 2, 2*a* are formed such that they can emit a light emission substantially in a direction parallel to the longitudinal axis 20 and in the direction of the open connector end.

If the light sources 2, 2*a* generate a light emission, this is coupled into the material of the translucent insert 3 through the coupling-in areas 3*b*.

In the embodiment example, the light sources 2, 2*a* comprise light-emitting diodes (LEDs). In the example, a first light-emitting diode 2 is arranged flat on the surface of a chip or another carrier surface; it is therefore formed as a surface mounted device (SMD). The light of this SMD-LED 2 strikes a coupling-in surface 3*b* of the translucent insert 3 and is coupled in there. A further light-emitting diode 2*a* is formed as a 3-mm LED, which protrudes into a receiver, formed by the translucent insert 3, which forms the coupling-in area 3*b*.

Figure 3:
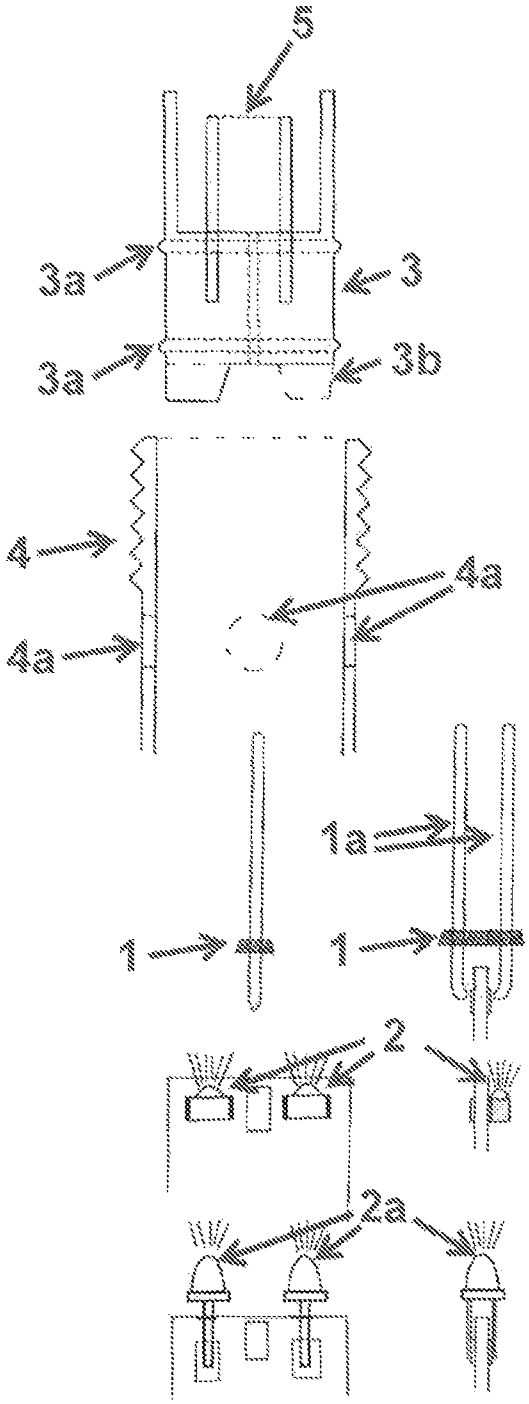
FIG. 3 is an exploded drawing of the embodiment example of the connector device.

Different constructions of the LEDs 2, 2*a* are shown in FIG. 3. Further designs of the LEDs 2, 2*a* as well as the corresponding coupling-in areas 3*b* can be used as an alternative or in addition to the forms described here.

In the translucent insert 3, coupled-in light is guided such that it can be emitted in a direction perpendicular to the longitudinal axis 20. In the embodiment example, this coupling-out of the output-light distribution is effected through recesses 4*a* of the housing 4.

In the embodiment example, the recesses 4 are arranged regularly around the longitudinal axis 20, in particular at an angle of 90° relative to each other in each case. This means that a light emission emitted by the light sources 2, 2*a* is deflected and guided such that the output-light distribution is emitted on four sides of the connector device 10 and of the housing 4.

In the embodiment example, the LEDs 2, 2*a* are supplied with electrical current to generate a light emission.

The actuation can be effected in different ways known per se, for instance by means of a control unit or by means of control electronics of a unit connected to the connector device 10, for instance a sensor or actuator. Such a control unit can be comprised by the connector device 10, for example integrated in the pin carrier plate 1.

In the embodiment example, the light sources 2, 2*a* are actuated such that they are switched on or off. For instance, a functional state of the unit connected to the connector device 10, for instance a sensor or actuator, can thereby be output. This means that the light emission is generated or switched off with a fixedly predefined intensity. A flashing with a particular frequency is generated by periodic switching on and off of the light emission.

A functional state of the unit that can be indicated by means of the LEDs 2, 2*a* can be formed in different ways. In an embodiment example, the unit to which the connector device 10 is connected can for example be a sensor, for instance a contactless sensor. An example of such a sensor is for instance an inductive sensor, for instance for contactless metal detection. Such a unit comprises its own electronics, for instance for controlling, measuring, processing signals, generating outputs or for similar purposes. In the example, these electronics of the unit can output different signal states, for instance by means of a flashing function or by means of other light functions of the LEDs 2, 2*a*. The functional states which can be output by means of the LEDs 2, 2*a* include for instance an operational readiness, a fault state, an object detection and another state of the sensor and/or of the associated electronics. In further embodiment examples, an actuator or another unit can be provided as an alternative or in addition to the sensor.

In the embodiment example, the flashing is generated depending on a data transfer by means of an SPE connection produced by the connector device 10. In particular, a flashing is effected when data are being transmitted. The actuation to flash can alternatively or additionally be effected with reference to control electronics of the unit connected to the connector device 10, for instance a sensor or actuator, for example in order to indicate a functional state of the unit.

Furthermore, a fault state can be detected, in which a data connection is faulty. When a fault state is detected, for example a flashing with a predefined frequency, a continuous illumination or a continuous deactivation of the light sources 2, 2*a* can be effected.

Furthermore, in a further embodiment example, the light sources 2, 2*a* can be actuated in an alternating manner or in a particular sequence, in particular according to a particular pattern, with the result that for example the output-light distribution is output in the recesses 4*a* on different sides of the housing 4.

In further embodiment examples, depending on a parameter of the connection produced by the connector device 10, a light parameter of the light emission of the light sources 2, 2*a* can be generated, for instance a particular colour or brightness, or a dynamic light parameter can be generated, for instance a flashing frequency. A relevant parameter of the connection can be for instance a data rate, a fault state, a transmission of electrical power or another parameter.

In the case of a connector device 10 according to the embodiment example shown, a user receives a signal feedback directly at an accessible port. The feedback by the LEDs 2, 2$a$ is visible in practically every assembly position through the four recesses 4$a$ arranged all around.

The connector device 10 illustrated in the present embodiment example makes a simple construction possible. For example, the connector device 10 can be integrated in a one-piece housing in the case of sensors formed as rod-shaped, which additionally improves the mechanical stability. Furthermore, installation space can thus be saved. Expensive and time-consuming adaptation solutions are thus dispensed with.

In the case of the connector device 10 such as in the present embodiment example, a particularly high mechanical strength can be achieved, particularly through the very highly integrated construction. An increased system safety can thus be achieved, also with respect to the protection of people, for instance compared with separate display units with comparable output function.

In the embodiment example, a design concept is implemented in which a connector according to the specifications of the IEC 63171-6 standard is implemented by means of four recesses 4$a$, in particular by means of four circular holes, in a housing 4 in conjunction with LED technology. The desired output is made possible by separating a connector assembly into a pin carrier assembly 1 with LEDs 2, 2$a$ and a translucent connector insert 3.

A further embodiment example of the connector device is explained with reference to FIGS. 4 and 5. This is constructed substantially similar to the embodiment example already explained above. The same reference numbers are therefore used to denote functionally identical or analogously formed elements.

Figure 4:
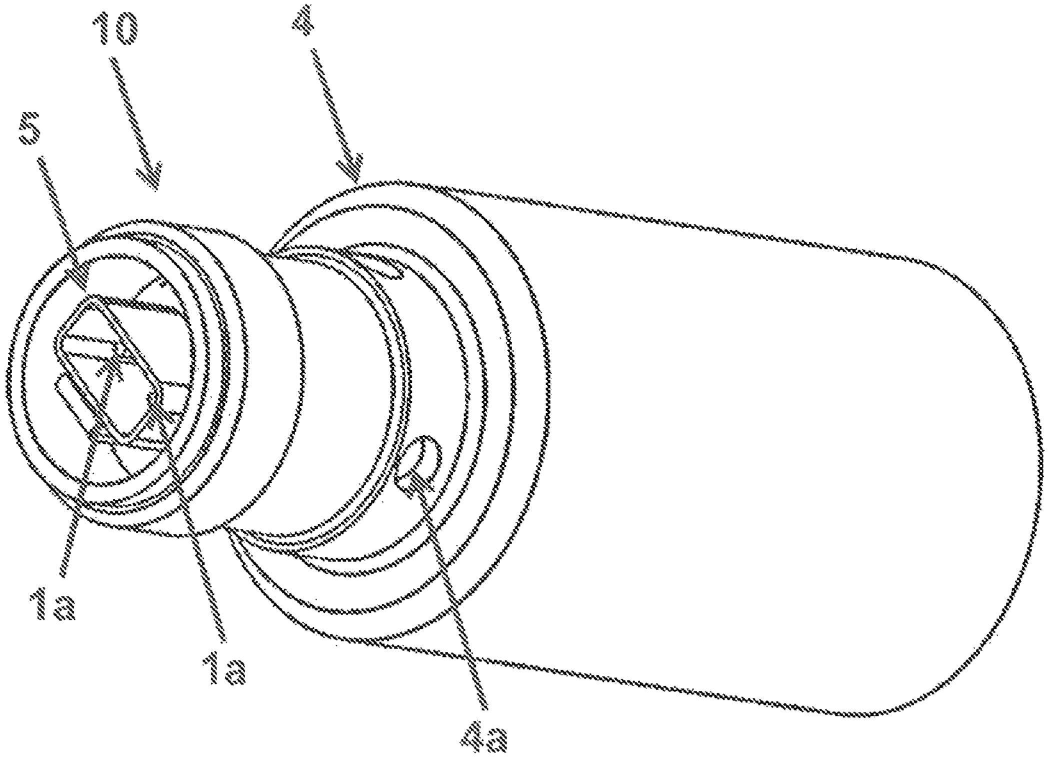
FIG. 4 is a perspective view of a further embodiment example of the connector device.
Figure 5:
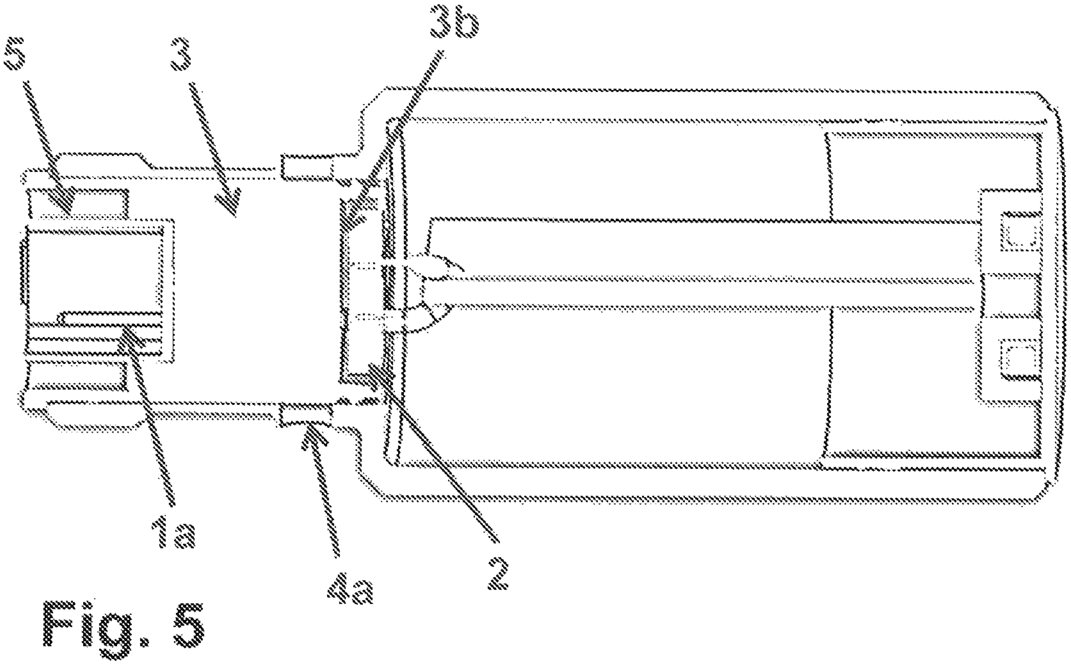
FIG. 5 is a cross-sectional representation of the further embodiment example of the connector device.

The connector device 10, as it is shown in FIG. 4 in a perspective view from the outside, has the two pins 1$a$, which are surrounded by the plug-in frame 5, at the open, connector-side end. Only one of the pins 1$a$ thereof is visible in the cross section of FIG. 5.

Furthermore, the connector device has recesses 4$a$ that are recognizable from the outside in the housing 4, through which the output-light distribution is emitted in the above-described manner, when the light sources 2 emit light.

A straight surface 3$b$, which the light emission generated by the light sources 2 strikes, here serves to couple the light in.

The embodiment examples explained above and shown in FIGS. 1 to 5 relate to connector devices 10 in which two pins 1$a$ are used to produce an SPE connection. Of course, the connector device 10 can also be formed complementary to this. In such a case, sockets or sleeves which are suitable for receiving pins 1$a$ and by means of which the SPE connection can be produced are arranged at the connector-side, open end of the connector device 10.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

- 1 connection element; pin carrier plate
- 1$a$ pin
- 2 light-emitting diode (surface mounted device, SMD)
- 2$a$ light-emitting diode (3-mm LED)
- 3 translucent insert; light-guide element
- 3$a$ sealing lip
- 3$b$ coupling-in area
- 4 housing
- 4$a$ recess; coupling-out area
- 5 plug-in frame
- 10 connector device; Single Pair Ethernet connector
- 20 longitudinal axis

The invention claimed is:

1. A Single Pair Ethernet (SPE) connector device comprising:

at least one connection element for an SPE connection;

a light source for generating a light emission; and a light-guide element; wherein the light source is set up to couple the generated light emission into the light-guide element, the light-guide element is set up to couple an output-light distribution out in a coupling-out area, and the connector device outputs a visually perceptible signal in response to receiving a request signal or data input.

2. The connector device according to claim 1, wherein the light source comprises at least one light-emitting diode.

3. The connector device according to claim 1, wherein the light source is set up to generate the generated light emission with a predefined light parameter, wherein the predefined light parameter is determinable by a control unit.

4. The connector device according to claim 3, wherein the light source is set up to generate the generated light emission with a dynamic change of the light parameter.

5. The connector device according to claim 1, wherein the light-guide element has a coupling-in surface where the generated light emission can be coupled in.

6. The connector device according to claim 1, wherein the light-guide element has a coupling-out surface in the coupling-out area.

7. The connector device according to claim 1, furthermore comprising a housing, wherein the coupling-out area comprises a recess in the housing.

8. The connector device according to claim 1, comprising a plurality of coupling-out areas.

9. A sensor device with the connector device according to claim 1.

10. The connector device according to claim 3, wherein the light source is set up to generate the generated light emission with the predefined light parameter with a color or an intensity.

11. The connector device according to claim 4, wherein the light source is set up to generate the generated light emission with the dynamic change of the light parameter with a periodically variable light parameter.

12. The connector device according to claim 4, wherein the light source is set up to generate the generated light emission with the dynamic change of the light parameter with a flashing.

13. The connector device according to claim 5, wherein the coupling-in surface extends substantially perpendicular to a longitudinal axis of the connector device.

14. The connector device according to claim 6, wherein the coupling-out surface extends substantially parallel to a longitudinal axis of the connector device.

15. The connector device according to claim 6, wherein the coupling-out surface extends along a cylindrical surface around a longitudinal axis of the connector device.

16. The connector device according to claim 8, wherein the coupling-out areas are arranged distributed evenly around a longitudinal axis of the connector device.

17. The connector device according to claim 3, wherein the request signal or the data input is received via a wired or wireless data connection.

18. The connector device according to claim 17, wherein the request signal or the data input is processed by the control unit, and the visually perceptible signal is effected by the control unit.

* * * * *